Patented Jan. 30, 1945

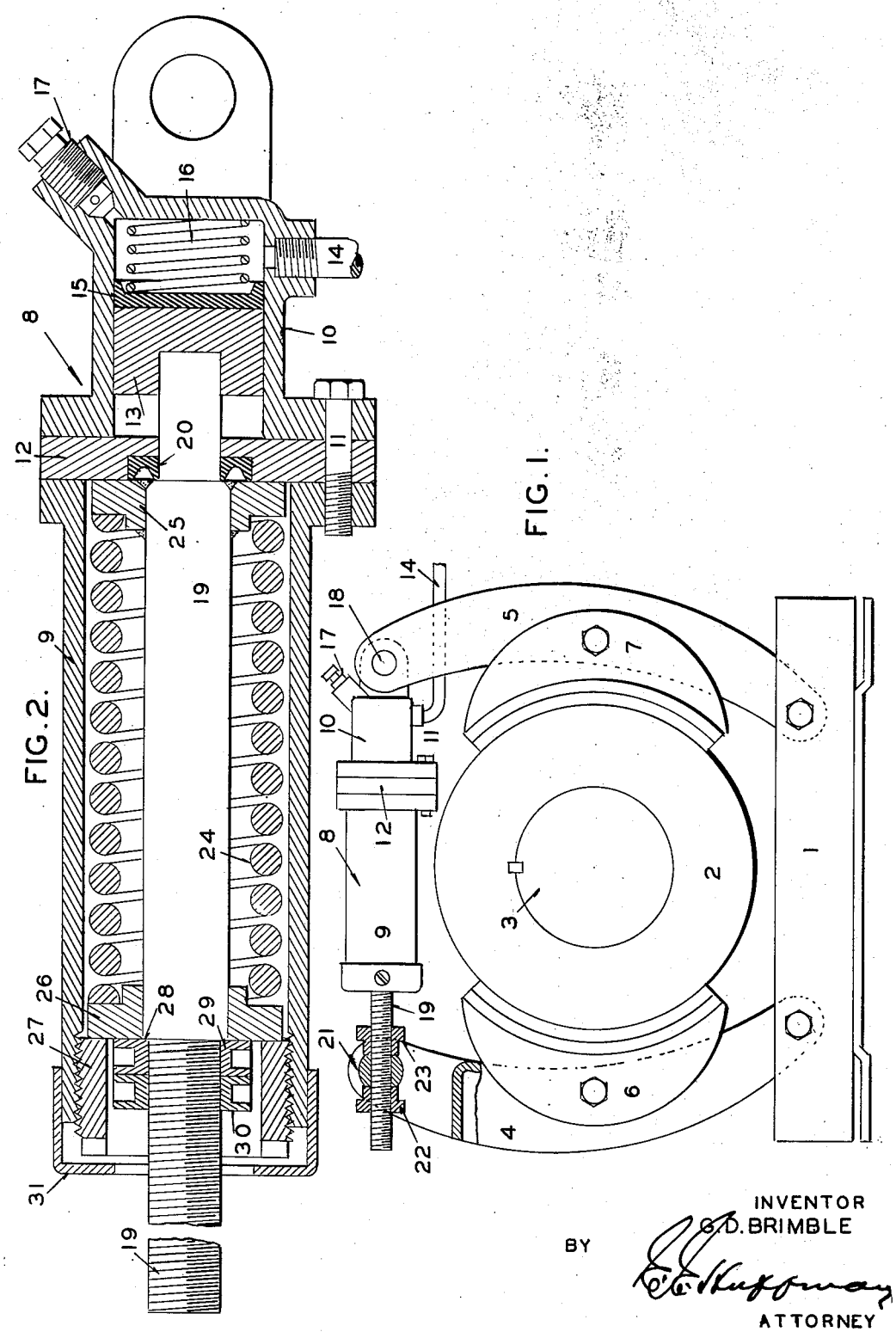

2,368,517

UNITED STATES PATENT OFFICE 2,368,517

BRAKE

George D. Brimble, University City, Mo., assignor to Wagner Electric Corporation, St. Louis, Mo., a corporation of Delaware Application July 2, 1942, Serial No. 449,378

4 Claims. (Cl. 188—170)

My invention relates to brakes and more particularly to a brake for industrial use.

One of the objects of my invention is to provide an improved brake which is applied by a spring and released by fluid pressure.

Another object of my invention is to provide an improved actuating unit for a brake which embodies an applying spring and a releasing fluid motor combined in a simple and compact manner and permitting easy assembly and adjustment of the spring.

Other objects of my invention will become apparent from the following description taken in connection with the accompanying drawing in which Figure 1 is a view of a brake embodying my invention; and Figure 2 is a sectional view of the assembled unit for applying and releasing the brake.

Referring to the figures in detail, 1 indicates a base which is positioned to one side of a brake drum 2 secured to a shaft 3. On opposite sides of the brake drum and pivotally mounted on the base are levers 4 and 5 extending beyond the brake drum. The lever 4 has pivotally mounted thereon a brake shoe 6 for cooperation with the drum and the lever 5 has pivotally mounted thereon a similar brake shoe 7 for cooperation with the drum.

Positioned between and pivotally connected to the non-pivoted ends of the levers is a brake actuating unit generally indicated by the numeral 8 and shown in detail in Figure 2. This unit has two axially aligned cylindrical casings 9 and 10 which are secured together by bolts 11, a plate 12 being interposed between the casings. Within the cylindrical casing 10 is a piston 13 and the cylinder portion ahead of this piston communicates with a conduit 14 which is employed to place the cylinder in communication with a source of pressure, as, for example, a master cylinder device. The piston has associated therewith a packing cup 15 which is held against its face by a spring 16. The cylindrical casing is also provided with a bleeder plug 17. The outer end of this cylindrical casing is adapted to be pivotally connected to the upper end of lever 5 by a pin 18.

Extending through the cylindrical casing 9 is a rod 19, the inner end of which passes through plate 12 and engages the rear of the piston 13 in the cylindrical casing 10. A suitable packing 20 is carried by the plate 12 and cooperates with the rod, thus sealing the cylindrical casing 10 from the cylindrical casing 9 so that dust and other foreign matter cannot enter the cylinder in which the piston reciprocates. The outer end of rod 19 is threaded and extends through a pivot pin 21 carried by the upper end of lever 4. Nuts 22 and 23 on rod 19 clamp said rod to the pin and also provide adjusting means.

A strong coil spring 24 is positioned within the cylindrical casing 9 and in surrounding relation to rod 19. One end of the spring abuts against a collar 25 secured, as by welding, to rod 19. The other end of the spring engages a collar 26 slidably mounted on the rod and this collar abuts a hollow adjusting nut 27 screwed into the outer end of the cylindrical casing 9. At the point where the threads of the rod begin, the rod is reduced to form a shoulder 28 and cooperating with this shoulder is a nut 29 which can be locked in position by a second nut 30. The outer end of the cylindrical casing 9 is covered by a cap 31.

With the unit 8 connected to the upper ends of levers 4 and 5 as shown, nuts 22 and 23 are so adjusted that spring 24 will exert a pressure holding the brakes in applied position. In other words, the nuts are so adjusted that the collar 25 will be moved away from plate 12, thus placing the spring under operating condition so that it is free to transmit its force to rod 19 and the cylindrical casings 9 and 10. However, the nuts are not adjusted to such an extent that the piston 13 will not have sufficient relative movement to the cylindrical casing 10 so as to release the brakes. With this arrangement it is seen that if fluid under pressure is admitted to the cylindrical casing 10 ahead of the piston, spring 24 will be additionally compressed and levers 4 and 5 spread apart to disengage the brake shoes from the drum. When it is again desired to apply the brakes, all that is necessary is to release the fluid pressure from the cylindrical casing 10, thus letting the spring move rod 19 and casings 9 and 10 relatively to one another to pull the upper ends of the levers inwardly.

It is to be noted that the threaded portion of rod 19 is of considerable length. This permits the spring 24 to be initially compressed in an easy manner by the nut 29 operating over the entire range of the threads. The initial compression can be done prior to the positioning of the rod and spring in the cylindrical casing 9. When the spring and rod are positioned in the cylinder, the hollow nut 27 can be screwed up so as to make the final adjustment of the spring. By the arrangement of having the spring initially tensioned by nut 29, it will not be necessary to start the screwing of nut 27 against any spring tension. When the final adjustment is once made by nut 27, it need not be altered. A cap 31 is employed to cover nut 27 and also nuts 29 and 30. When lining wear takes place, adjustment to compensate therefor is accomplished by nuts 22 and 23. This adjustment must be made whenever the lining becomes so worn that the collar 25 abuts plate 12 since under these conditions the spring can no longer transmit its force to the brake shoe carrying levers.

From the foregoing description it is seen that the actuating unit is compactly constructed and all the working parts are properly protected from the elements and any foreign matter. The construction also permits pre-compression of the spring before assembly and easy final adjustment for operation purposes. Also adjustment for lining wear can be easily made at any time.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a controlling unit for applying and releasing a brake, a rod adapted to have one end connected to one part of the brake, abutment means on the other end of the rod, a coil spring surrounding the rod and having one end engaging the abutment means, means on the rod cooperatig with the other end of the spring for initially compressing said spring, a member adapted to be connected to another part of the brake, means connecting said member to said other end of the spring and including an adjustable abutment means for additionally compressing the spring and causing it to act on the rod and member, and fluid pressure means supported solely on the brake by the rod and member for moving the rod relatively to the member so as to place the two abutment means closer together and prevent the spring from transmitting an applying pressure to the brake.

2. In a controlling unit for applying and releasing brake friction elements, axially aligned cylindrical casings, a piston in one casing, a rod connected to said piston and extending through the other casing, abutment means on said rod adjacent the piston, a coil spring in said other casing in surrounding relation to the rod and having one end engaging the abutment means, means carried by the rod and cooperating with the other end of the spring for initially compressing said spring, and adjustable abutment means carried by said other casing and also cooperating with the last named end of the spring for additionally compressing said spring and causing it to apply force to move the rod and both casings relatively.

3. In braking mechanism having a drum and cooperating brake friction elements mounted on pivoted levers, means cooperating with the levers for applying and releasing the friction elements, said means comprising a cylinder connected to one lever, a piston in the cylinder, a rod connected between the piston and the other lever, means for adjusting said rod relatively to the lever, a coil spring surrounding said rod, abutment means carried by the rod for the end of the spring adjacent the piston, other means on the rod associated with the other end of the spring for placing said spring under initial compression, means connected to the cylinder and providing abutment means for the other end of the spring, and means for adjusting the last named abutment so as to compress the spring an additional amount and cause said spring to transmit a force to the cylinder through the connecting means.

4. In a brake having two spaced brake applying elements, a controlling unit connected between the elements and carried solely thereby, said unit comprising a rod provided with threads at one end extending over a substantial portion of its length, nuts on said threads for adjustably connecting the rod to one of the brake applying elements, a coil spring surrounding the rod, abutment means on the rod for the end of the spring remote from the threads, a nut on the threads for initially compressing the spring on the rod, a member connected to the other brake applying element, means separate from the nut for additionally compressing the spring between the abutment means on the rod and the member so as to condition the spring for applying pressure to both brake elements, and means for moving the rod and member relatively to each other and in directions so as to further compress the spring and thereby release the brake applying elements said last named means being supported on the brake applying elements solely by the rod and member.

GEORGE D. BRIMBLE.